Patented Oct. 17, 1933

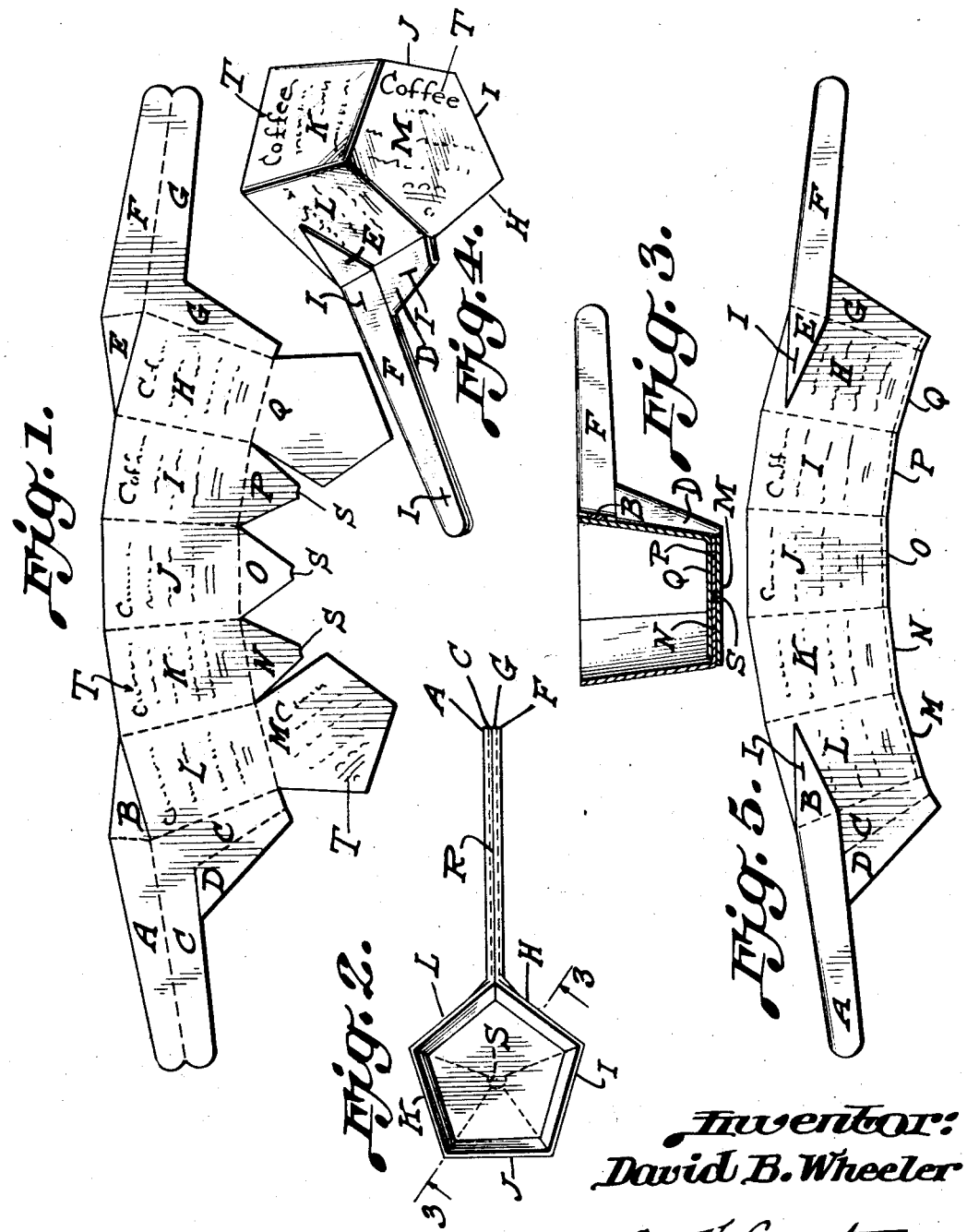

1,931,213

UNITED STATES PATENT OFFICE 1,931,213

MEASURE AND ADVERTISING MEDIUM

David Bird Wheeler, Washington, D. C.

Application February 24, 1930. Serial No. 430,872

2 Claims. (Cl. 229—52)

The object of my invention is to provide a novel device for use in measuring uniformly a fixed and given quantity of a certain selected article of food or beverage prepared from the raw material according to a definite recipe or formula to thereby produce a uniform high quality of the food or beverage so prepared ready for use.

Primarily it is the object of my invention to provide a measure for coffee of the approximate size to measure the amount of coffee which is best adapted to produce a cup of coffee of excellent quality and also to provide an inexpensive and convenient measuring device which is also adapted to carry advertising matter on its walls.

The purpose of the advertising feature is to provide a special means for marketing the measure in addition to the usual method of selling it direct to the users, or this concentrated method of distributing the measure may be substituted for the usual method of direct selling. The method as devised offers a sufficient inducement and an unquestionable advantage to manufacturers and packers of food and beverage raw materials to so systematize the preparation of their products and to furnish the measure free to purchasers of their goods and to enclose a measure in each package which establishes and maintains this concentrated method of selling the measure instead of selling it direct to users, and economizes the advertising which was devised to provide an advertising policy or program. The measure is purposely constructed of material unsuitable for use for measuring or preparing any other article, consequently it is thus purposely made unsuitable for advertising any other article, which serves to render the advertising service undivertable from its intended purpose and can not be appropriated by others for advertising other goods. This plan and article intentionally preserves the inducement for manufacturers and packers of such goods to continue to furnish the measure after having adopted it.

I attain these and other objects of my invention by the device illustrated in the accompanying drawing, in which—

Figure 1 is a plan view of the blank form which my preferred form of measure is made;

Fig. 2 is a top plan view of the completed measure;

Fig. 3 is a section on line 3—3 of Fig. 2;

Fig. 4 is a perspective view of the outside of the measure; and

Fig. 5 is a view of the blank in partially folded position.

Referring to the accompanying drawing, I provide a blank, as shown in Fig. 1, of the appropriate shape to form a measure, the solid lines indicating the edges along which the material is cut to the necessary shape to form a measure, and the dotted lines indicating the lines on which the material is to be creased or folded to the desired shape to complete the measure. The sides of the measure are designated by the numerals L, K, J, I, and H and the members L and H are provided with large bottom flaps M and Q respectively which with the smaller tabs N, O, and P form the bottom of the measure.

I provide the extensions C and G constituting the inner portions of the handle and the extensions A and F which constitute the outer portions of the handle, the extensions or flaps B and E being cut for gluing or otherwise securing to the outer surfaces of the respective sections or sides L and H, as shown in Figs. 4 and 5. The flaps C and G, when brought together, are glued to each other at R as shown in Fig. 2, or may alternatively be fastened by suitable clips I, as shown in Fig. 4.

I also provide a flap D cut as shown in Fig. 1 for folding over the corresponding portion of the flap G. This also may be secured in place by glue or by a suitable clip I. The flaps M, N, O, P, Q are suitably secured with the flap M outermost, the flaps N, O, P intermediately positioned, and the flap Q innermost, as shown in section in Fig. 3, the respective flaps being preferably glued to each other, or if desired they may be secured by a suitable central clip (not shown) or other suitable means. The small flaps N, O, and P preferably have their points cut off at S, as shown in Fig. 1, so that if there is a slight variation in length it will not prevent the proper formation of the bottom of the measure. When the measure is bent or folded and handle glued together as shown in Figs. 2, 3 and 4, it forms a pentahedrally shaped bowl with a short handle formed by the members A, C, F, and G.

The measure as thus constructed is formed of one piece of material without seams. The sides are attached to the bottom by the sides and bottom members being left joined together, and the handle is attached to the side of the measure from the bottom to the top by the flaps C and G being left attached to the side members and the attachment is strengthened or reinforced by the members A, B, and E and F overlapping the members C and G and being secured as shown in the drawing.

The handle is of a suitable size and length and protrudes from one corner of the measure in a line with the center of the bowl with a flat side or edge of one section of the bowl opposite the handle, all of which makes the measure convenient for dipping up the material and thus filling the measure level full of the material and thereby measures the required amount to be poured into the mixture being prepared.

Members A, F, L, K, J, I, H, and M are plain flat outer surfaces provided on which to visibly print a desired formula or recipe.

It is a well known fact that most domestic servants, and many housewives themselves pay but scant attention to proportions of ingredients required to prepare and properly cook food and in consequence the product is variable due to the indefinite way of preparing and cooking even though the best of food materials are used.

Manufacturers and packers of raw food and beverage materials have had printed and distributed free, thousands of pamphlets and other printed forms containing recipes for cooking or otherwise preparing their products ready for use. The object is largely to avoid their products from being spoiled in preparation or cooking and consequently the material (however excellent) condemned as a poor quality. Therefore, these printed recipes are furnished largely to protect their products from poor cooking as well as to furnish definite instructions for producing a good quality of their food products prepared ready for use. Also these pamphlets are utilized as advertising mediums to bring the merits of their goods to the attention of persons to whom one of their recipe pamphlets may be distributed and notwithstanding the fact that they are seldom kept but usually lost or discarded and makes the expense of having them printed and distributed a questionable advantage as advertising mediums or recipe information.

Recipes for preparing food prescribe no definite proportions or amounts of ingredients as there is no practical means for measuring amounts, especially small amounts. Ingredients usually are prescribed by the teaspoon or tablespoon-full or a cup-full or a half or a quarter of a cup or sometimes wineglass full, all of which are not definite enough measurements to secure definite results. While such measurements are definite enough to measure some of the ingredients for preparing food but not definite enough to measure other ingredients required and with the utmost care in measuring, the variation is sufficient to spoil the food or to produce a poor quality. All dietists and food experts fully realize and agree that it is as important to carefully measure the proportions and ingredients of foods being prepared as it is to exactly measure the ingredients of a chemical compound or a prescription, as the quality of food is fully as important as the quality of medicine.

As the measure will serve to insure good food it will in turn produce a demand for the particular article of goods with which it is packed and the uses of it are thus systematized. Furthermore the measure provides a new medium for advertising. The measure is constructed of a size exclusively suitable for measuring the particular article of food or material contained in the package in which the measure is packed and to which alone it is suitable for measuring thereby, to a considerable extent, preventing its diversion to other uses. If it was discovered by trial or test that the measure could be used for measuring other articles, the limited durability of the measure, which is made of cardboard or paper, would prevent it from being used as a permanent kitchen utensil for measuring.

The particular measure illustrated in the drawing is the one designed specifically for measuring the appropriate amount of ground coffee to be used in making one cup of coffee. This particular measure is made of cardboard and the pentahedral shape of the bowl with the handle protruding from one corner and in line with the center of the bowl provides a very convenient form of measuring device.

It will also be noted that the various sides of the measure may all be simultaneously printed with recipes or advertising matter, or both, while the measure is still in the form of a blank, so that the cost of printing is reduced to a minimum. Likewise the adhesive material or glue may be applied to all adhering or glued members or flaps simultaneously. The cost of producing the measure is therefore small.

Recipes and advertising matter are designated T in the drawing and printed on the outer surface of the measure.

What I claim is:

1. As a new article of manufacture, a measure formed from a blank of cardboard or similar flexible material, comprising a strip adapted to be folded to form a pentahedrally shaped measure and having a plurality of tabs adapted to be folded inwardly and secured together to form the bottom of the measure, and having handle extensions each of said handle extensions being of sufficient size and suitable shape to permit of double folding whereby a handle of four thicknesses of material is formed when the handle members are brought together in constructing the measure, the handle being positioned at one of the corners of the pentahedral measure and opposite one of the flat sides of the measure whereby it may be more conveniently used to scoop up powdered or ground material, the handle extensions including a strip extending downwardly to the bottom of the measure, one of said strips having a flap adapted to be folded over the other strip and secured thereto to reinforce the completed handle.

2. As a new article of manufacture, a measure formed from a blank of cardboard or similar flexible material, comprising a strip adapted to be folded into a multiple-sided measure, the blank having separate flaps for each side of the measure, said flaps being of suitable size to completely cover the bottom of the measure and form the bottom thereof, when folded inwardly and secured together, the blank also having extensions of sufficient size and suitable shape to permit of double folding and foldable over each other to form handle members of plural thicknesses of material when the handle members are brought together in constructing the measure, the handle being positioned at one of the corners of the measure, the handle extensions including a strip extending downwardly to the bottom of the measure, one of said strips having a flap adapted to be folded over the other strip and secured thereto to reinforce the completed handle, the measure being of a predetermined size to hold the exact quantity of a particular material such as coffee to constitute the right quantity of the food such as one cup of coffee suitable for one person, whereby to conveniently measure accurately the amount of raw material, such as ground coffee, to be used in making the desired food product such as coffee to a predetermined amount and in proper proportion.

DAVID BIRD WHEELER.